(12) United States Patent
Cheng (10) Patent No.: US 11,578,649 B2
(45) Date of Patent: *Feb. 14, 2023

(54) INTERNAL COMBUSTION ENGINE WITH CHARGING SYSTEM

(71) Applicant: Chia-Chun Cheng, New Taipei (TW)

(72) Inventor: Chia-Chun Cheng, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,708

(22) Filed: Jan. 27, 2022

(65) Prior Publication Data

US 2022/0298964 A1    Sep. 22, 2022

(30) Foreign Application Priority Data

Mar. 22, 2021   (TW) .................. 110110250

(51) Int. Cl.
*F02B 75/24*   (2006.01)
*F02M 35/10*   (2006.01)
(Continued)

(52) U.S. Cl.
CPC .............. *F02B 75/24* (2013.01); *F01L 1/047* (2013.01); *F01L 1/14* (2013.01); *F02M 35/10222* (2013.01)

(58) Field of Classification Search
CPC ........ F02M 35/1022; F01L 1/04; F01L 1/047; F01L 1/14; F02B 75/18; F02B 75/1896;
(Continued)

(56) References Cited

U.S. PATENT DOCUMENTS

| | | | | |
|---|---|---|---|---|
| 1,984,862 A | * | 12/1934 | Bucklen | .................. F02B 25/00 123/73 V |
| 4,449,488 A | * | 5/1984 | Heaton | ................. F01B 13/045 123/62 |

(Continued)

FOREIGN PATENT DOCUMENTS

| | | |
|---|---|---|
| CN | 204327265 U | 5/2015 |
| TW | M557302 U | 3/2018 |
| TW | M614077 U | 7/2021 |

OTHER PUBLICATIONS

Office Action dated Dec. 27, 2021 of the corresponding Taiwan patent application No. 110110250.

*Primary Examiner* — John Kwon
*Assistant Examiner* — Johnny H Hoang
(74) *Attorney, Agent, or Firm* — Chun-Ming Shih; HDLS IPR Services (57) ABSTRACT

The disclosure relates to a charging system, which includes a crankshaft chamber, two cylinder chambers, a crankshaft connecting rod mechanism, two pistons, an intake pipe, two draft tubes, and a rotating rod control mechanism. The crankshaft connecting rod mechanism is installed in the crankshaft chamber. Each piston is received in the cylinder chambers and connected with the crankshaft connecting rod mechanism. The intake pipe only communicates with the crankshaft chamber. One end of each draft tube only communicates with the crankshaft chamber and another end only communicates with each cylinder chamber. The check valve is installed in the crankshaft chamber. The rotating rod control mechanism includes a rotating rod and a sealing block fixedly connected and rotating with the rotating rod. The sealing block blocks and seals a joint between the crankshaft chamber and each draft tube.

11 Claims, 14 Drawing Sheets

(51) Int. Cl.
*F01L 1/14* (2006.01)
*F01L 1/047* (2006.01)

(58) Field of Classification Search
CPC .......... F02B 75/24; F02B 33/04; F02B 33/28; F02B 2075/025; F01B 1/08; F01M 1/04; F01M 3/00; F02F 1/00; F02F 7/00; F02F 7/0009
See application file for complete search history.

(56) References Cited

U.S. PATENT DOCUMENTS

| | | | | |
|---|---|---|---|---|
| 4,972,809 | A * | 11/1990 | Hirasawa | F02B 75/243 440/89 R |
| 5,799,628 | A * | 9/1998 | Lacerda | F02P 3/10 123/58.2 |
| 6,318,320 | B1 * | 11/2001 | Tosaka | F01L 1/024 123/55.2 |
| 7,959,415 | B2 * | 6/2011 | Schuetzle | F04B 35/06 417/564 |
| 8,721,300 | B2 * | 5/2014 | Schuetzle | F04B 27/053 417/273 |
| 10,012,145 | B1 * | 7/2018 | Araujo | F02B 75/243 |
| 2019/0120136 | A1 * | 4/2019 | Cheng | F01M 3/00 |

\* cited by examiner

INTERNAL COMBUSTION ENGINE WITH CHARGING SYSTEM

BACKGROUND

Technical Field

The disclosure relates to an internal combustion engine structure, particularly to an internal combustion engine with a charging system.

Related Art

An internal combustion engine (ICE) sucks external air into the combustion chamber through an intake pipe, then an air-fuel mixture is burned and ignited in the combustion chamber, and the gas mixture is heated to expand and converted into mechanic energy through a mechanic mechanism to produce mechanical work so as to convert chemical energy of fuel into mechanic energy. The ICEs are widely applied to vehicles, ships, and airplanes.

A reciprocating piston type ICE has four processes including intake, compression, combustion, and exhaustion. The four-stroke cycle is that the cycle of intake, compression, working, and exhaustion is completed through four strokes (i.e., a piston moves from one end of a cylinder to the other end), and the two-stroke cycle is that the cycle of intake, compression, working, and exhaustion is completed through two strokes.

However, under the condition of the same exhaustion, the power generated from a four-stroke ICE is about half of that generated from a two-stroke ICE. Because the exhaustion and the intake are processed separately in a four-stroke ICE separately to prevent the non-ignited gas from being exhausted, the four-stroke ICE reduces fuel consumption and air pollution. It is advantageous in environmental protection. Thus, how to improve the power efficiency of a four-stroke ICE is an important issue for the industry.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides to an internal combustion engine with a charging system, which uses a sealing block to block and seal the joint between the crankshaft chamber and the draft tube to improve the power efficiency of the internal combustion engine with the charging system during the intake stroke in the cylinder chamber.

In an embodiment of the disclosure, the disclosure provides an internal combustion engine with a charging system, which includes: a crankshaft chamber; at least two cylinder chambers; a crankshaft connecting rod mechanism, installed in the crankshaft chamber; at least two pistons, separately received in the cylinder chambers, and separately connected and acting with the crankshaft connecting rod mechanism; an intake pipe, only communicating with the crankshaft chamber; at least two draft tubes, one end of each draft tube only communicating with the crankshaft chamber and another end of each draft tube only communicating with each cylinder chamber; a check valve assembly including: a check valve, installed at a joint between the intake pipe and the crankshaft chamber; and at least two first switch valve, separately installed at a joint between each draft tube and each cylinder chamber; and a rotating rod control mechanism, installed in the crankshaft chamber, and including: a rotating rod; and a sealing block, fixedly connected to the rotating rod, and rotating with the rotating rod and blocking and sealing a joint between the crankshaft chamber and each draft tube.

Accordingly, when the left cylinder chamber generates the intake stroke, the sealing block may block and close the joint between the crankshaft chamber and the right draft tube to make fuel, air and lubricant be unable to flow into the right draft tube. The fuel, air and lubricant only fill the left cylinder chamber and the left draft tube to reduce the volume of the left cylinder chamber and increase the pressure of the left cylinder chamber. When the right cylinder chamber generates the intake stroke, the sealing block may block and close the joint between the crankshaft chamber and the left draft tube to make fuel, air and lubricant be unable to flow into the left draft tube. The fuel, air and lubricant only fill the right cylinder chamber and the right draft tube to reduce the volume of the right cylinder chamber and increase the pressure of the right cylinder chamber. Therefore, the combustion cycle of the cylinder chamber may generate greater combustion force to improve the power efficiency of the internal combustion engine with the charging system.

DETAILED DESCRIPTION

The technical contents of this disclosure will become apparent with the detailed description of embodiments accompanied with the illustration of related drawings as follows.

It is intended that the embodiments and drawings disclosed herein are to be considered illustrative rather than restrictive.

Please refer to FIGS. 1-13. The disclosure provides an internal combustion engine with a charging system. The internal combustion engine 10 includes a crankshaft chamber 1, at least two cylinder chambers 2, a crankshaft connecting rod mechanism 3, at least two pistons 4, an intake pipe 5, at least two draft tubes 6, at least two spark plugs 7, at least two exhaust pipes 8, a check valve assembly 9 and a rotating rod control mechanism 20.

As shown in FIGS. 1-2 and 4-13, the crankshaft chamber 1 has a left portion 11, a right portion 12, an upper portion 13 and a lower portion 14. In the embodiment, the amount of each of the cylinder chambers 2, the pistons 4, the draft tubes 6, the spark plugs 7 and the exhaust pipes 8 is, but not limited to, two. One of the cylinder chambers 2 is connected to the left portion 11, and the other one of the cylinder chambers 2 is connected to the right portion 12.

As shown in FIGS. 5, 7, 9, 11 and 13, the crankshaft connecting rod mechanism 3 is installed in the crankshaft chamber 1. In detail, the crankshaft connecting rod mechanism 3 includes a crankshaft disc 31 and connecting rods 32 with the same amount as the cylinder chambers 2. The crankshaft disc 31 is installed in the crankshaft chamber 1. One end of each connecting rod 32 is connected with the crankshaft disc 31 and the other end of each connecting rod 32 passes through each cylinder chamber 2.

As shown in FIGS. 5, 7, 9, 11 and 13, each piston 4 is connected to the crankshaft connecting rod mechanism 3 and is received in each cylinder chamber 2. In other words, each piston 4 is connected to each connecting rod 32 and reciprocates in each cylinder chamber 2 with each connecting rod 32. The crankshaft chamber 1 and each cylinder chamber 2 are isolated by each piston 4. Two pistons 4 jointly move toward or away from the crankshaft chamber 1, and the moving directions d of the two pistons 4 are, but not limited to, parallel. The moving directions of the two pistons 4 may also be in a V-shaped manner or a perpendicular manner.

As shown in FIGS. 7, 9, 11 and 13, the intake pipe 5 only communicates with the crankshaft chamber 1. One end of each draft tube 6 only communicates with the crankshaft chamber 1 and the other end of each draft tube 6 only communicates with each cylinder chamber 2. In detail, the intake pipe 5 is connected to the upper portion 13, the two draft tubes 6 are separately connected to the lower portion 14, and the intake pipe 5 is used to guide the mixture of fuel, air, and lubricant into the crankshaft chamber 1.

As shown in FIGS. 5, 7, 9, 11 and 13, each spark plug 7 is connected on a side of each cylinder chamber 2 away from the crankshaft chamber 1, and is arranged corresponding to each cylinder chamber 2. Each exhaust pipe 8 only communicates with each cylinder chamber 2. Each draft tube 6 and each exhaust pipe 8 are separately disposed on two sides of each spark plug 7.

As shown in FIGS. 4-13, the check valve assembly 9 includes a check valve 91, a first switch valve 92 and a second switch valve 93. The amount of the first switch valve 92 and the second switch valve 93 is the same as the cylinder chamber 2. The check valve 91 is installed at a joint a1 between the intake pipe 5 and the crankshaft chamber 1. Each first switch valve 92 is installed at a joint a2 between each draft tube 6 and each cylinder chamber 2. Each second switch valve 93 is installed at a joint a3 between each exhaust pipe 8 and each cylinder chamber 2.

In detail, the check valve 91 is used to guide fluid to flow from the intake pipe 5 to the crankshaft chamber 1, and the check valve 91 may prevent fluid from flowing to the intake pipe 5 from the crankshaft chamber 1. The first switch valve 92 is used to open or close the communication between the draft tubes 6 and the cylinder chambers 2. The second switch valve 93 is used to open or close the communication between the exhaust pipes 8 and the cylinder chambers 2.

As shown in FIGS. 2-13, the rotating rod control mechanism 20 is installed in the crankshaft chamber 1 and includes a rotating rod 201 and a sealing block 202. The sealing block 202 is fixedly connected to the rotating rod 201 and rotates with the rotating rod 201. The sealing block 202 may block and seal a joint a4 between the crankshaft chamber 1 and each draft tube 6.

In addition, the rotating rod control mechanism 20 further includes two first tappets 203 and a first cam 204. The first cam 204 is fixedly connected to the rotating rod 201 and rotates with the rotating rod 201. One end of each first tappet 203 is connected to each first switch valve 92 and the other end of each first tappet 203 may be pushed by the first cam 204.

Moreover, the rotating rod control mechanism 20 further includes two second tappets 205 and a second cam 206. The second cam 206 is fixedly connected to the rotating rod 201 and rotates with the rotating rod 201. One end of each second tappet 205 is connected to each second switch valve 93 and the other end of each second tappet 205 may be pushed by the second cam 206.

Figure 1:
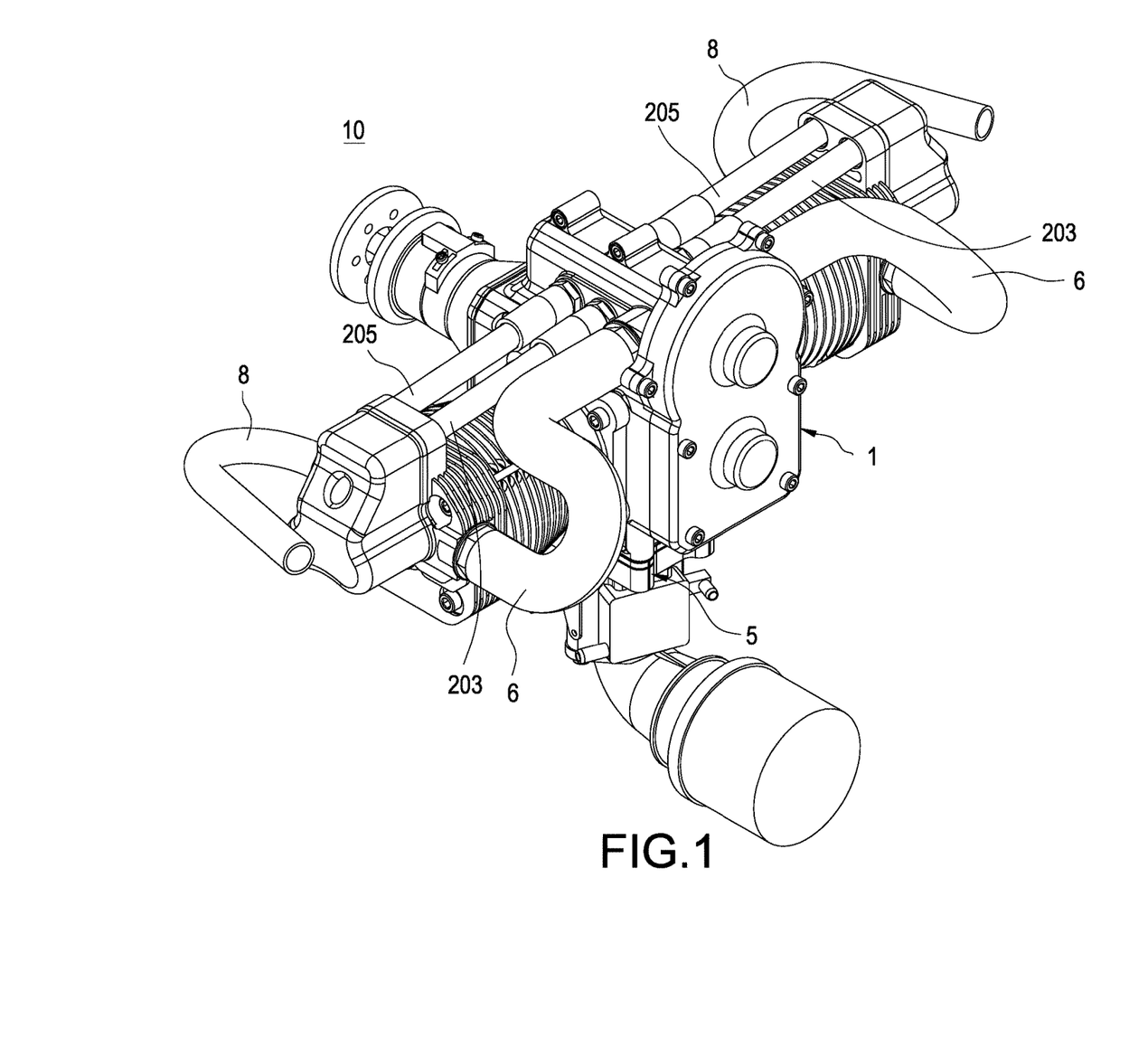
FIG. 1 is an assembled view of the internal combustion engine with the charging system of the disclosure.
Figure 2:
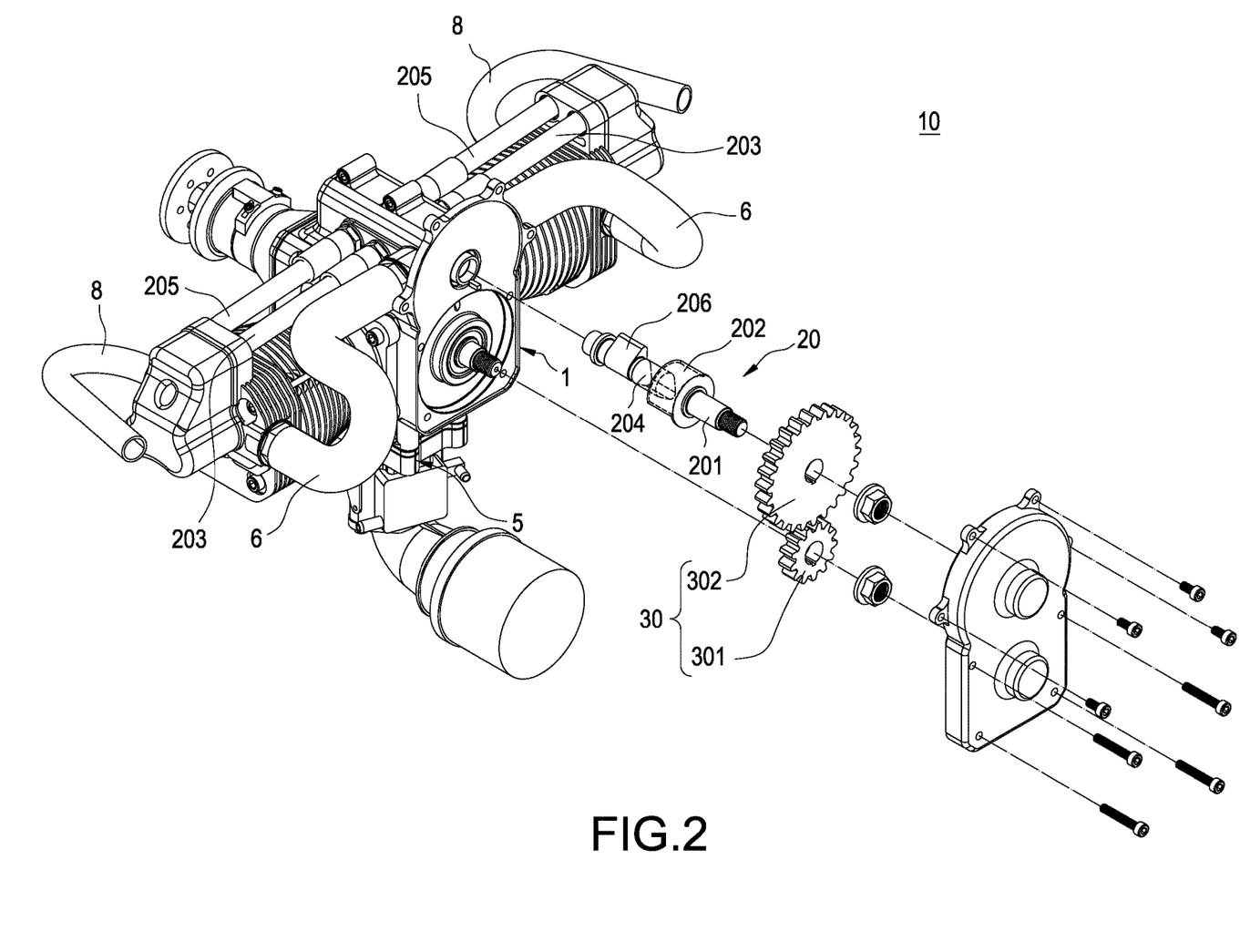
FIG. 2 is an exploded view of the internal combustion engine with the charging system of the disclosure.
Figure 3:
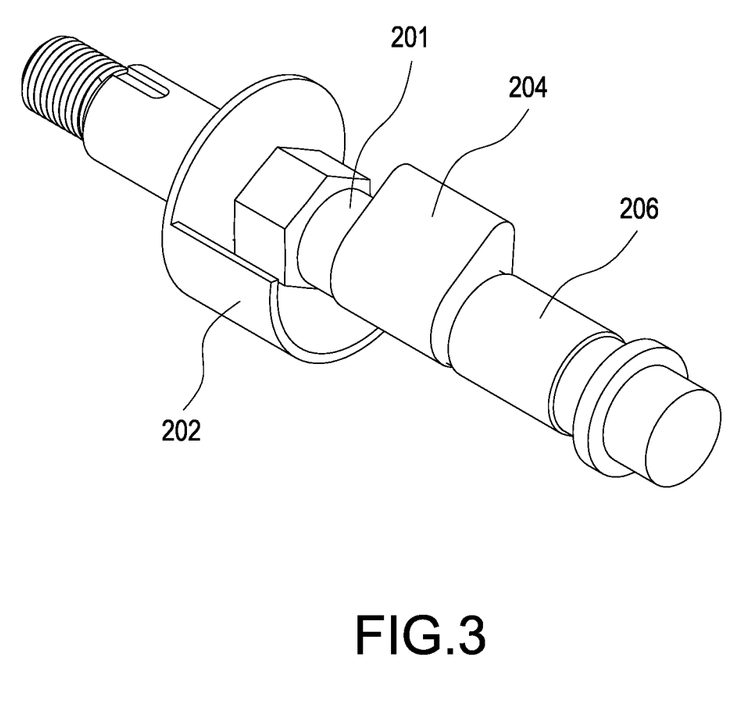
FIG. 3 is a perspective schematic view of the rotating rod of the disclosure.
Figure 4:
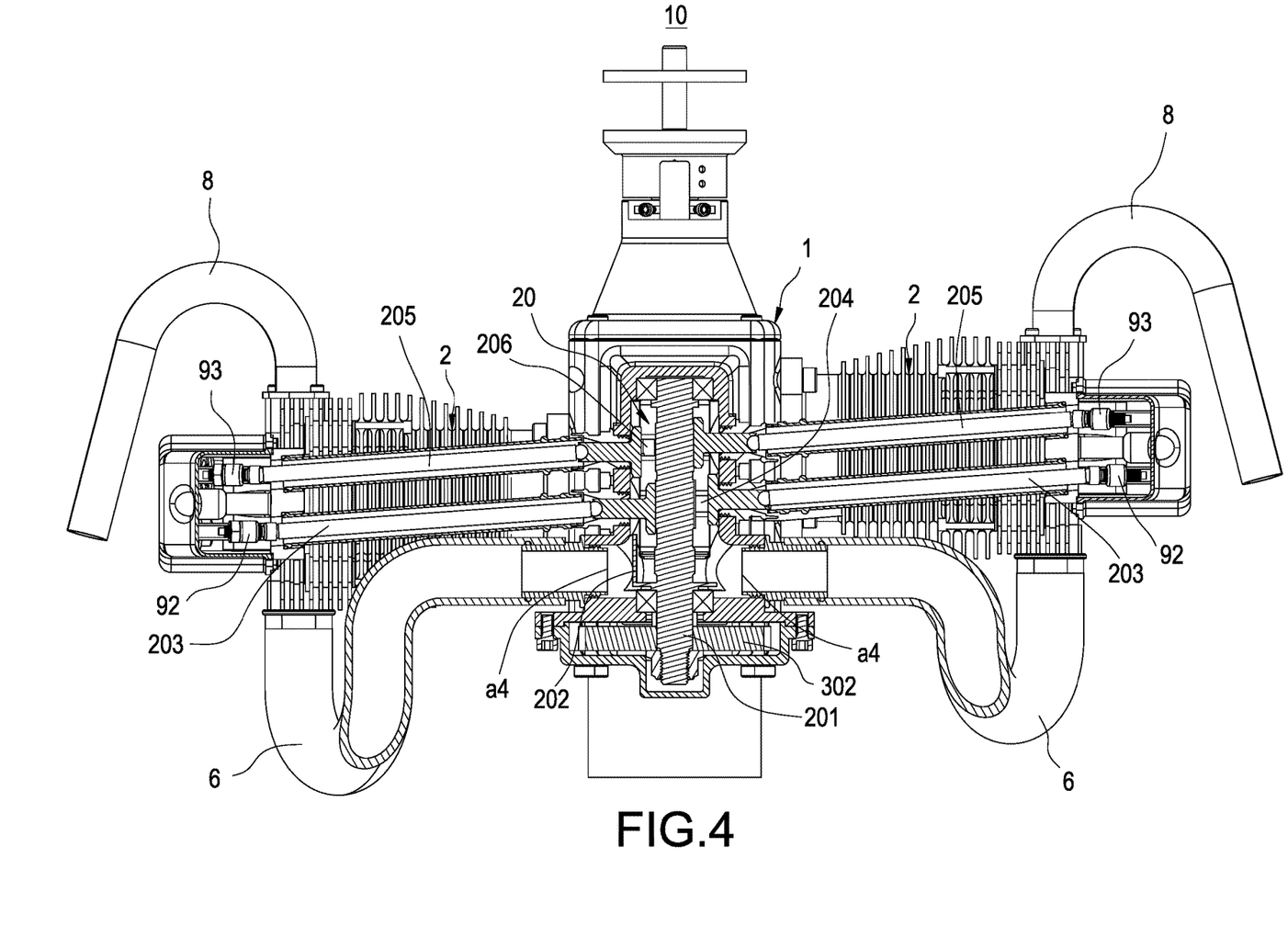
FIG. 4 is a cross-sectional view of the internal combustion engine with the charging system of the disclosure.
Figure 5:
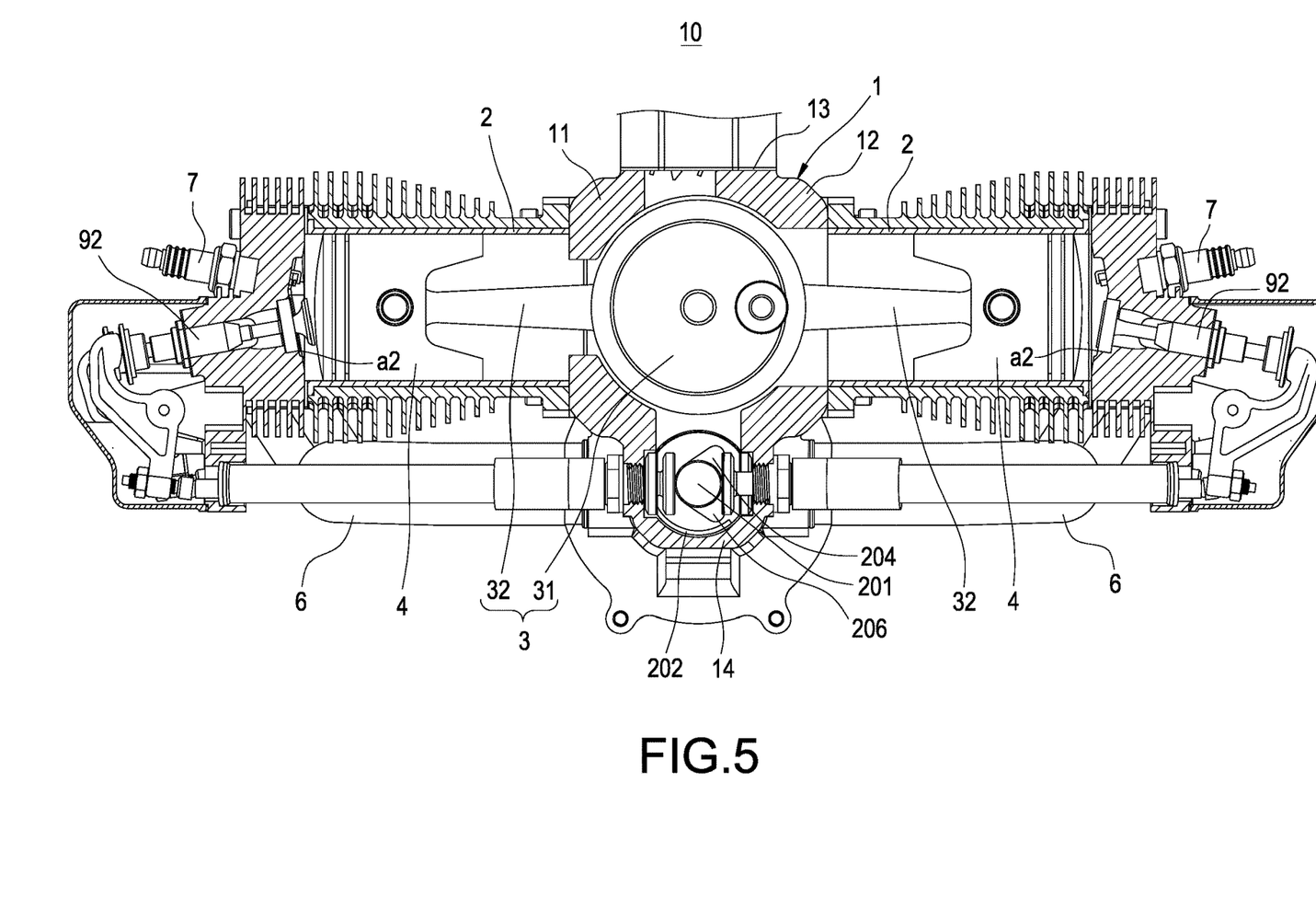
FIG. 5 is another cross-sectional view of the internal combustion engine with the charging system of the disclosure.

As shown in FIGS. 2 and 4, the internal combustion engine 10 of the internal combustion engine of the disclosure further includes a linkage gear set 30 installed in the crankshaft chamber 1. The linkage gear set 30 includes a first gear 301 and a second gear 302. The first gear 301 is fixedly connected to the crankshaft disc 31 and rotates with the crankshaft disc 31. The second gear 302 is engaged with the first gear 301. The second gear 302 is fixedly connected to the rotating rod 201 and drives the rotating rod 201 to rotate. The gear ratio of the first gear 301 to the second gear 302 is 1:2.

Figure 6:
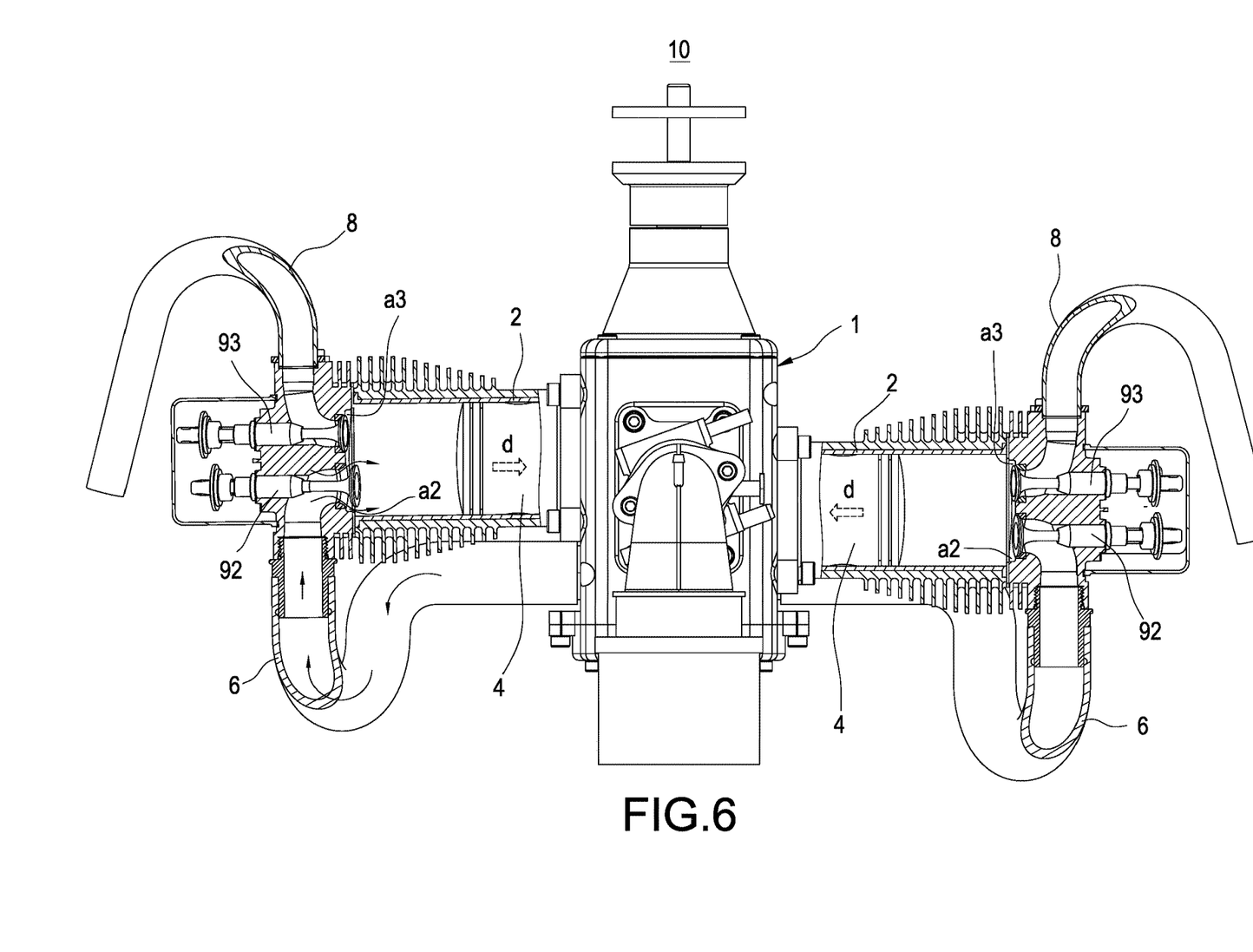
FIG. 6 is a schematic view of the first using status of the internal combustion engine with the charging system of the disclosure.
Figure 7:
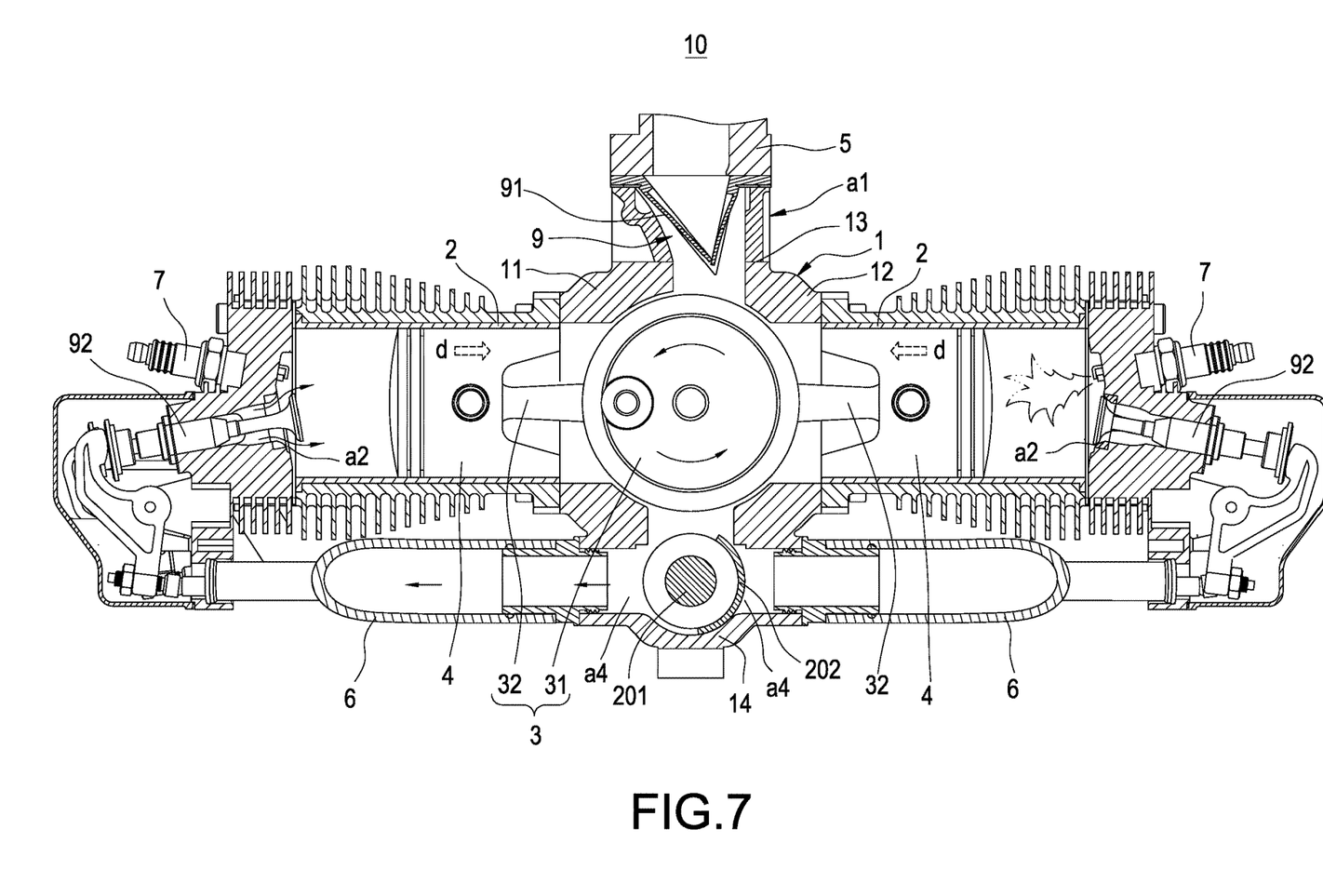
FIG. 7 is a schematic view of the second using status of the internal combustion engine with the charging system of the disclosure.

As shown in FIGS. 6-13, the using statuses of the internal combustion engine 10 with the charging system of the disclosure are depicted. In the first using status, as shown in FIGS. 6-7, the right spark plug 7 is ignited to make the right cylinder chamber 2 generate the combustion cycle. When the combustion cycle occurs, the first cam 204 does not push the right first tappet 203 and the second cam 206 does not push the right second tappet 205 so as to close the right first switch valve 92 and the right second switch valve 93. The sealing block 202 completely occludes the whole cross-sectional area of the joint a4 to make the sealing block 202 block and seal the joint a4 between the crankshaft chamber 1 and the right draft tube 6. The pressure from the combustion offers the pistons 4 thrust to make the two pistons 4 jointly move toward the crankshaft chamber 1 and to cause increasing of the internal gas pressure in the crankshaft chamber 1 to close the check valve 91 to further prevent fuel, air, and lubricant from flowing to the intake pipe 5 from the crankshaft chamber 1. Finally, the first cam 204 pushes the left first tappet 203 to make fuel, air, and lubricant flow to the left cylinder chamber 2 via the left first switch valve 92 to generate the intake stroke.

Figure 8:
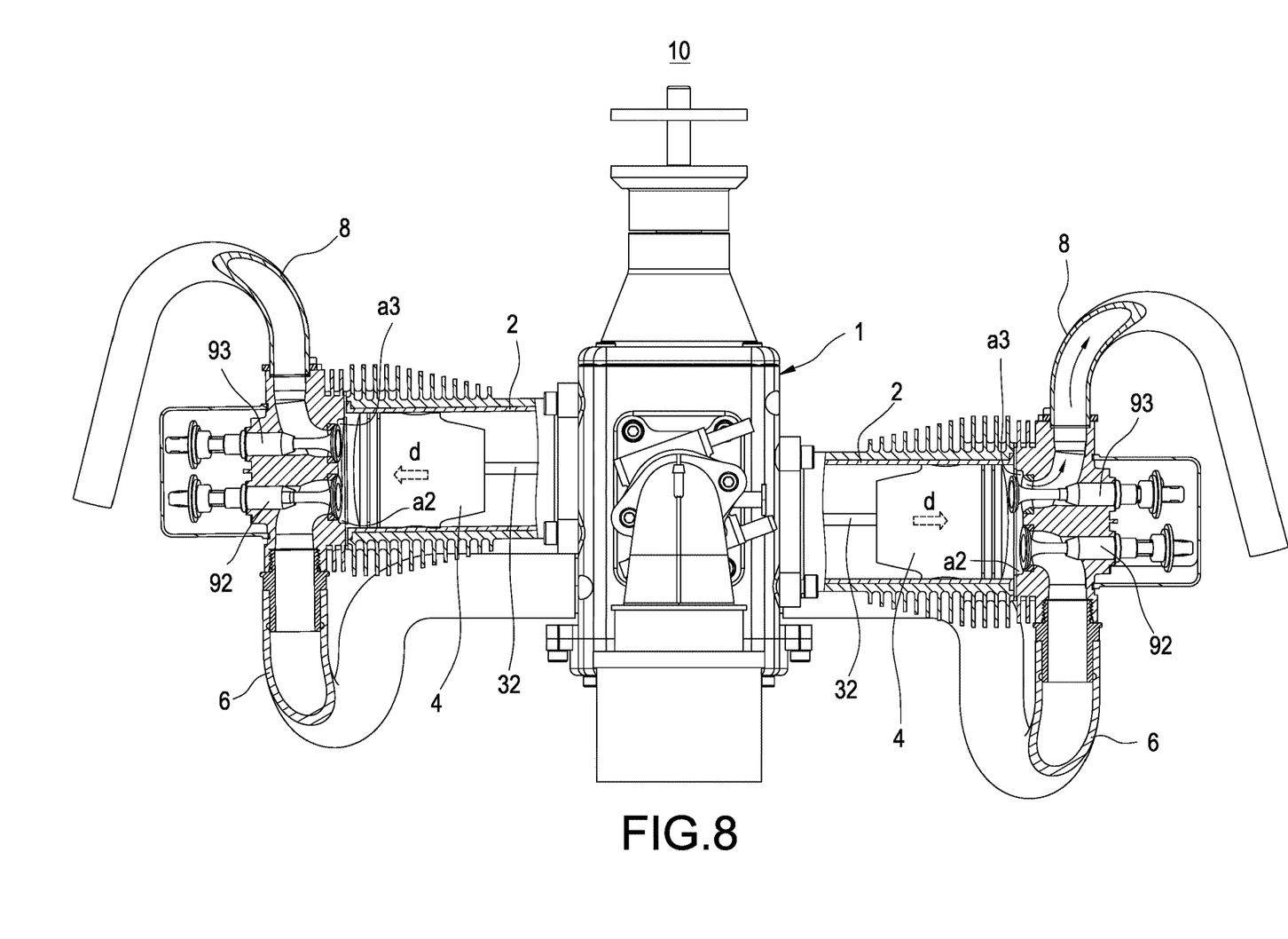
FIG. 8 is a schematic view of the third using status of the internal combustion engine with the charging system of the disclosure.
Figure 9:
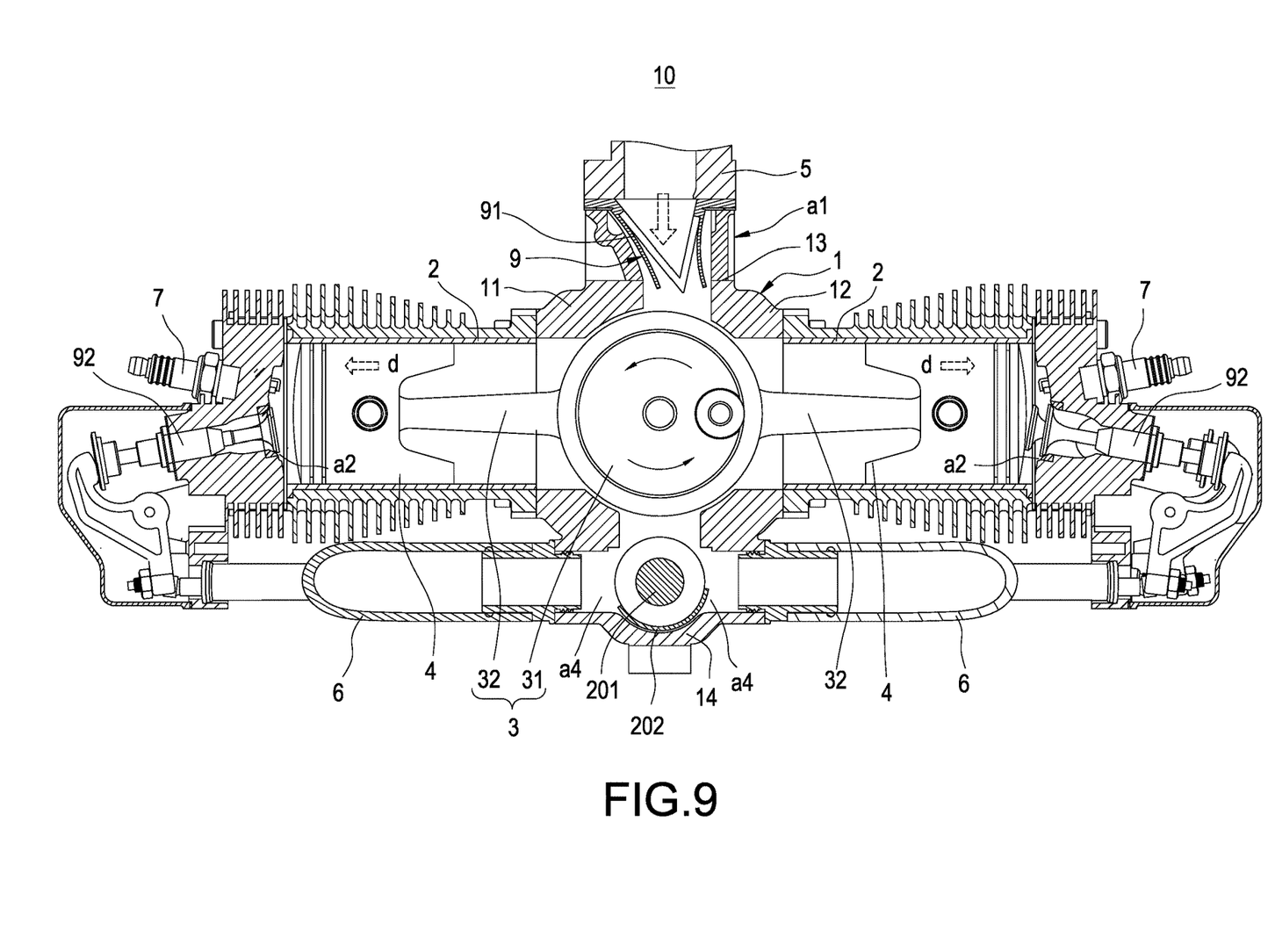
FIG. 9 is a schematic view of the fourth using status of the internal combustion engine with the charging system of the disclosure.

In the second using status, as shown in FIGS. 8-9, the two pistons 4 are driven to jointly move away from the crankshaft chamber 1 to cause decreasing of the internal gas pressure in the crankshaft chamber 1 to open the check valve 91, the first cam 204 does not push the left first tappet 203 and the second cam 206 does not push the left second tappet 205 so as to close the left first switch valve 92 and the left second switch valve 93 to make the inside of the left cylinder chamber 2 be in a closed status. When the piston 4 continues to compress the internal space of the left cylinder chamber 2, the fuel, air and lubricant are continuously compressed to generate the compression stroke. Because the first cam 204 does not push the right first tappet 203 but the second cam 206 pushes the right second tappet 205 so as to close the right first switch valve 92 and open the right second switch valve 93, the exhaust gas generated by the combustion stroke inside the right cylinder chamber 2 may be ejected to the right exhaust pipe 8 via the right second switch valve 93 to generate the exhaust stroke.

Figure 10:
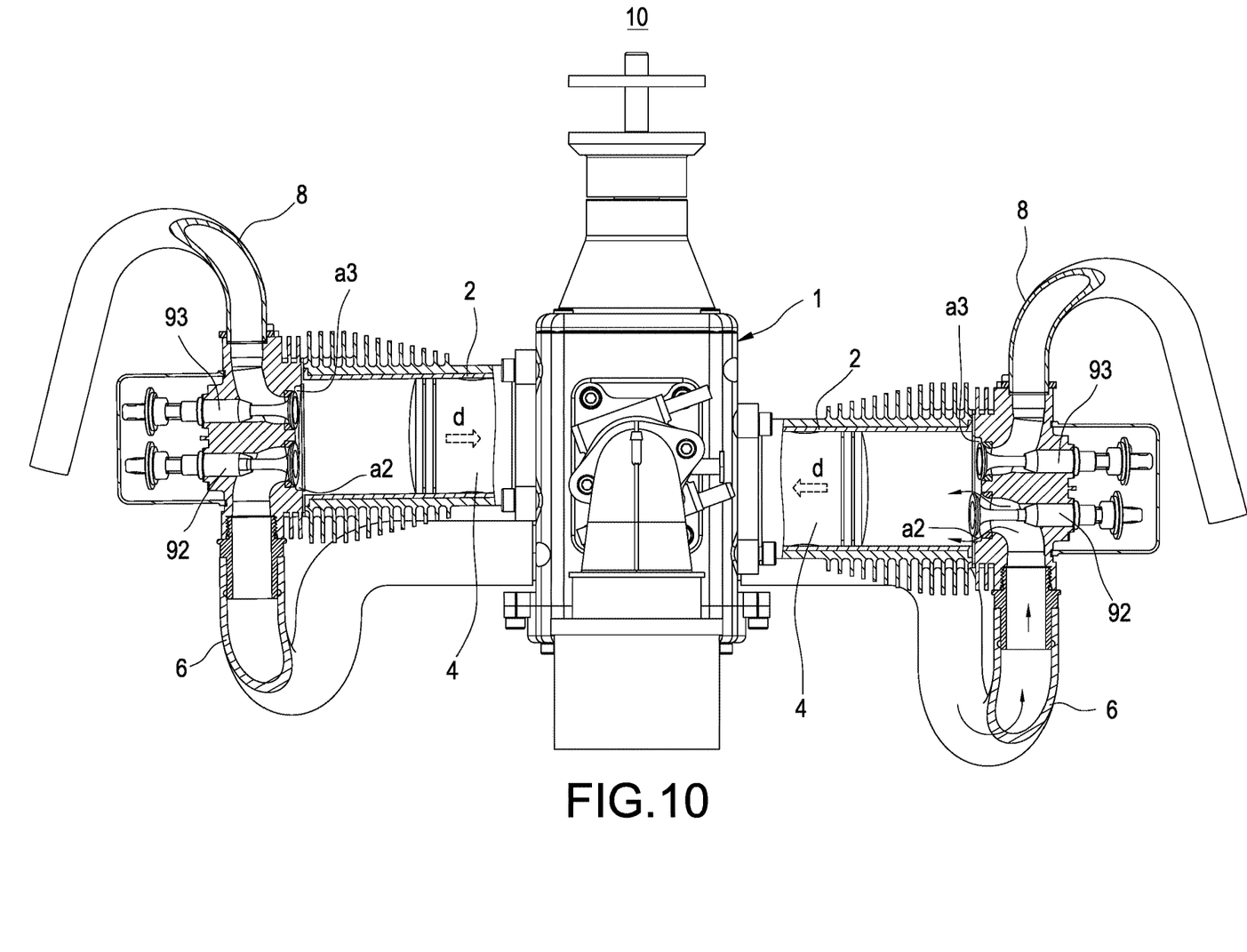
FIG. 10 is a schematic view of the fifth using status of the internal combustion engine with the charging system of the disclosure.
Figure 11:
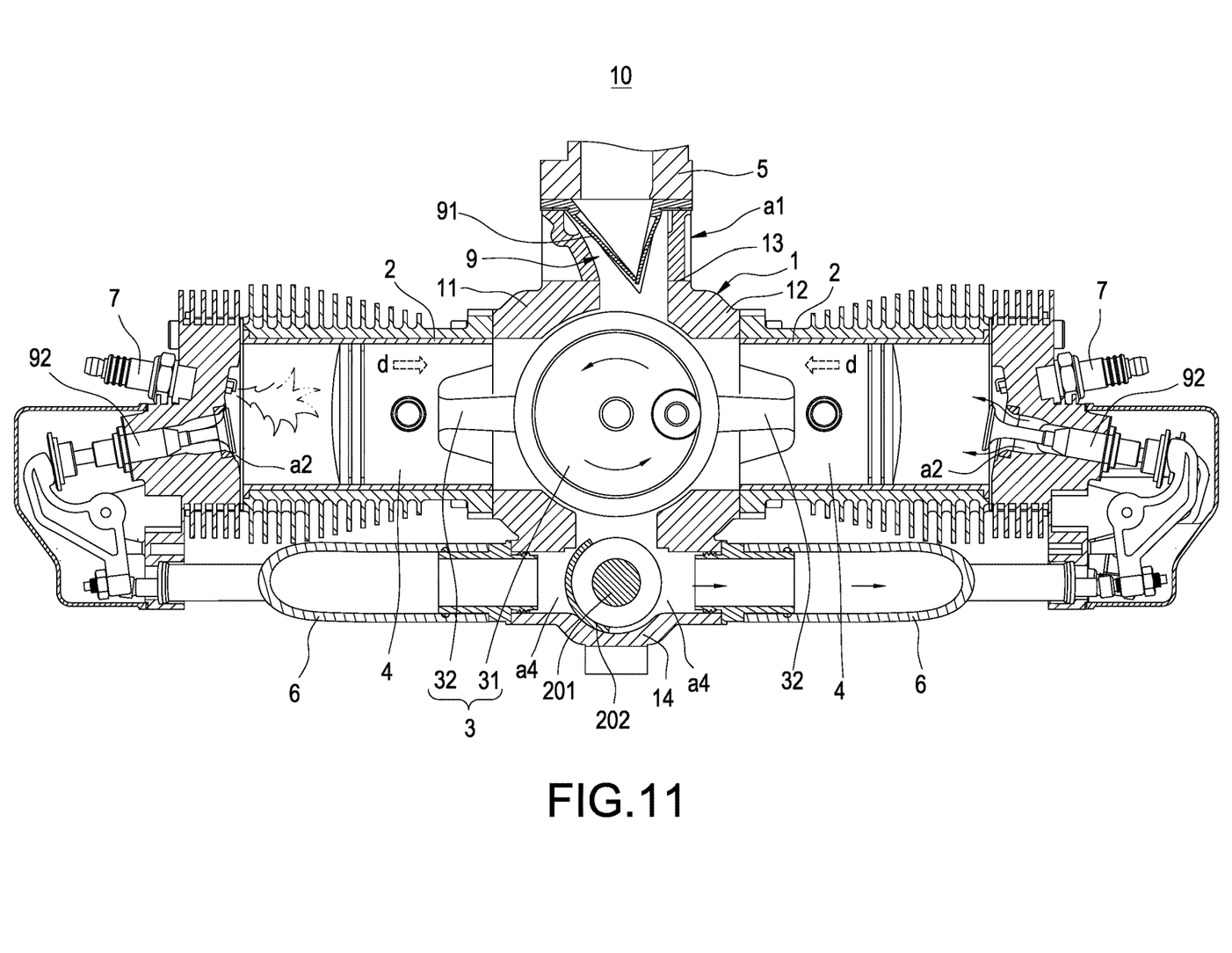
FIG. 11 is a schematic view of the sixth using status of the internal combustion engine with the charging system of the disclosure.

In the third using status, as shown in FIGS. 10-11, the left spark plug 7 is ignited to make the left cylinder chamber 2 generate the combustion stroke. When the combustion stroke occurs, the first cam 204 does not push the left first tappet 203 and the second cam 206 does not push the left second tappet 205 so as to close the left first switch valve 92 and the left second switch valve 93. The sealing block 202 completely occludes the whole cross-sectional area of the joint a4 to make the sealing block 202 block and seal the joint a4 between the crankshaft chamber 1 and the left draft tube 6. The pressure from the combustion offers the pistons 4 thrust to make the two pistons 4 jointly move toward the crankshaft chamber 1 and to cause increasing of the internal gas pressure in the crankshaft chamber 1 to close the check valve 91 to further prevent fuel, air, and lubricant from flowing to the intake pipe 5 from the crankshaft chamber 1. Finally, the first cam 204 pushes the right first tappet 203 to make fuel, air, and lubricant flow to the right cylinder chamber 2 via the right first switch valve 92 to generate the intake stroke.

Figure 12:
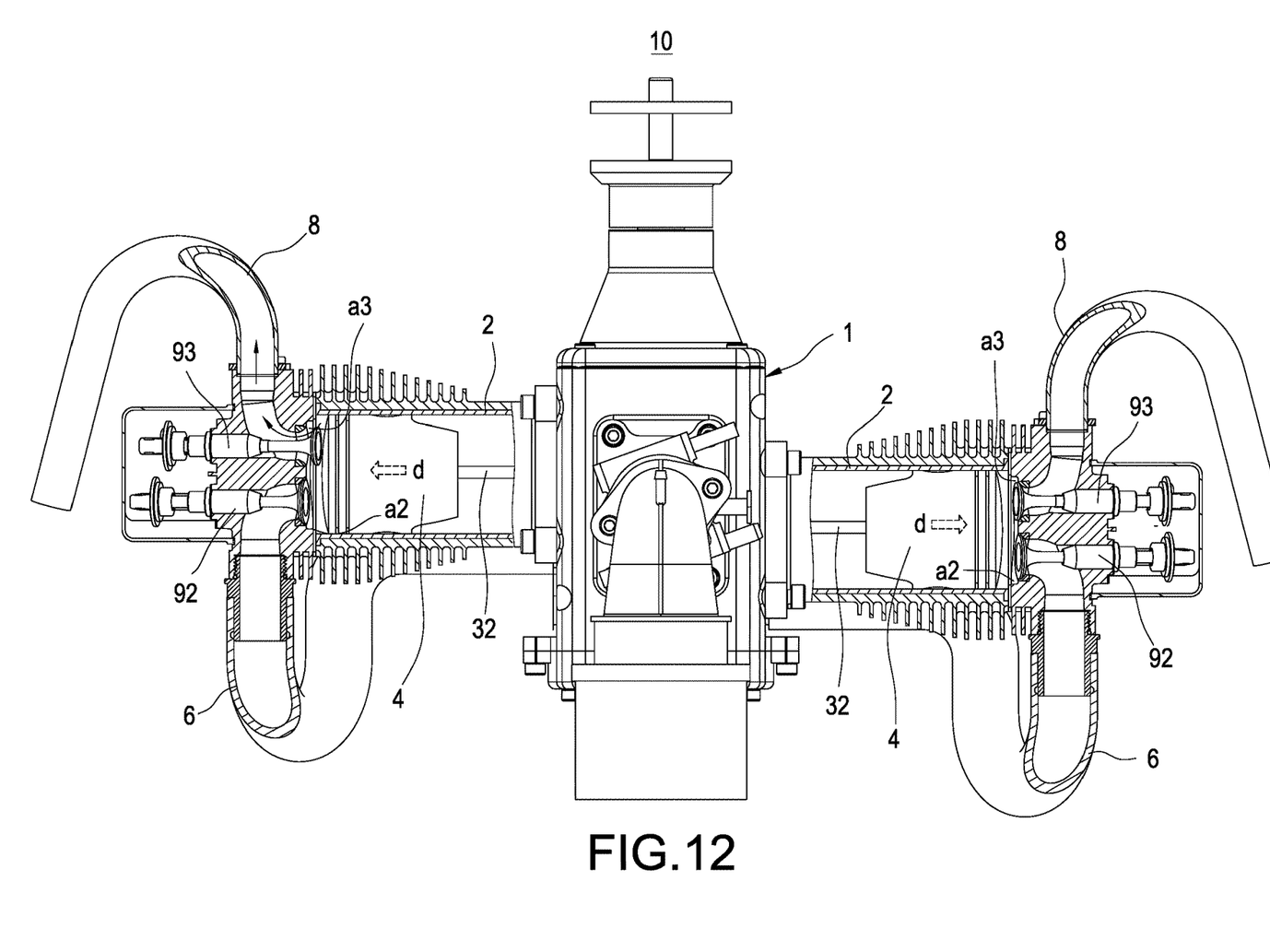
FIG. 12 is a schematic view of the seventh using status of the internal combustion engine with the charging system of the disclosure.
Figure 13:
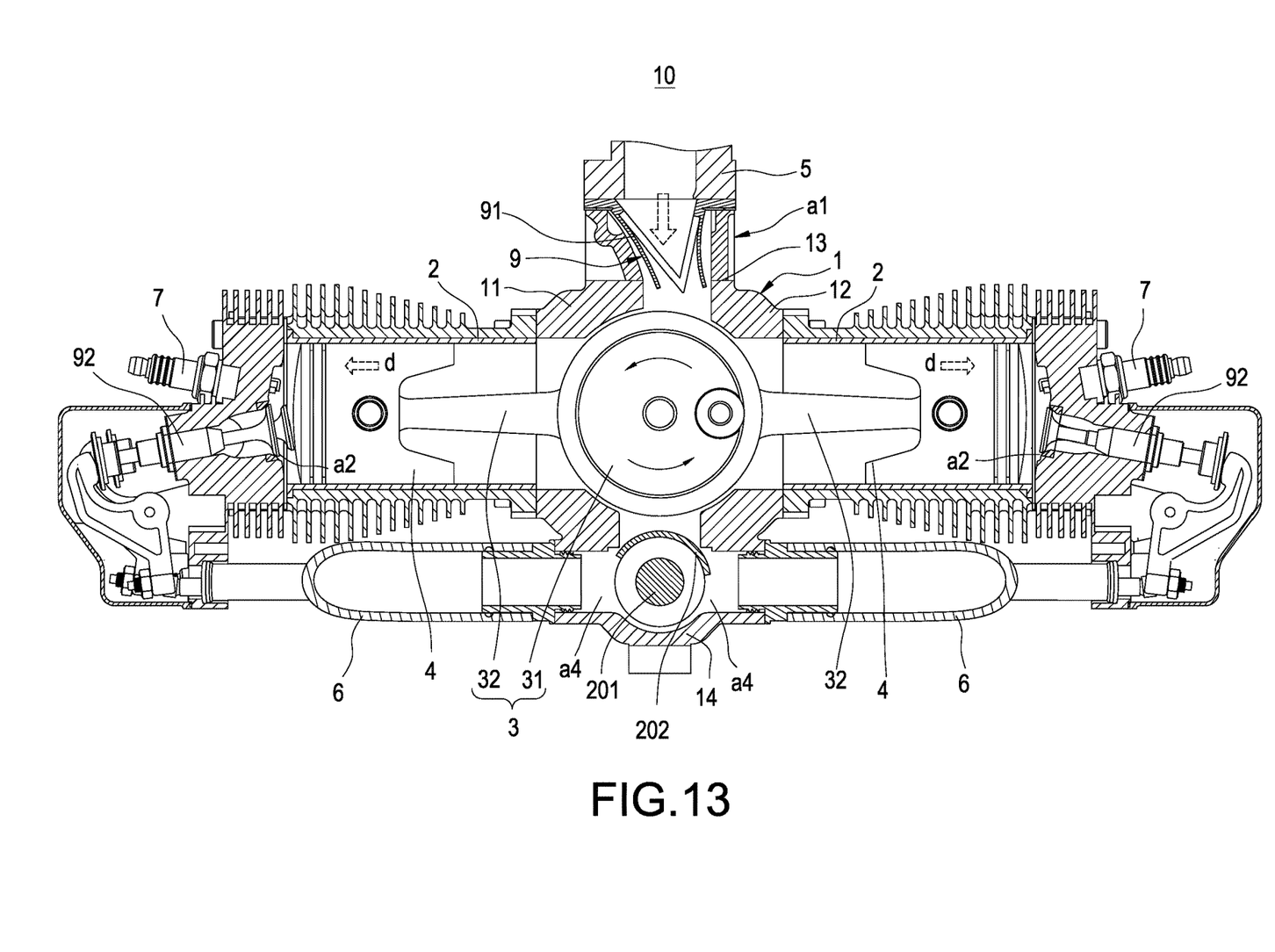
FIG. 13 is a schematic view of the eighth using status of the internal combustion engine with the charging system of the disclosure.

In the fourth using status, as shown in FIGS. 12-13, the two pistons 4 are driven to jointly move away from the crankshaft chamber 1 to cause decreasing of the internal gas pressure in the crankshaft chamber 1 to open the check valve 91, the first cam 204 does not push the right first tappet 203 and the second cam 206 does not push the right second tappet 205 so as to close the right first switch valve 92 and the right second switch valve 93 to make the inside of the right cylinder chamber 2 be in a closed status. When the piston 4 continues to compress the internal space of the right cylinder chamber 2, the fuel, air and lubricant are continuously compressed to generate the compression stroke. Because the first cam 204 does not push the left first tappet 203 but the second cam 206 pushes the left second tappet 205 so as to close the left first switch valve 92 and open the left second switch valve 93, the exhaust gas generated by the combustion stroke inside the right cylinder chamber 2 may be ejected to the left exhaust pipe 8 via the left second switch valve 93 to generate the exhaust stroke. Therefore, as shown in FIGS. 1-13, a motion process of a four-stroke internal combustion engine is completed.

As shown in FIGS. 9 and 13, when the two pistons 4 jointly move away from the crankshaft chamber 1 to completely compress the two cylinder chambers 2, the intake amount of the crankshaft chamber 1 is the intake amount of the two cylinder chambers 2. As shown in FIG. 7, the two pistons 4 jointly move toward the crankshaft chamber 1 to completely compress the crankshaft chamber 1, the intake amount of the two cylinder chambers 2 (the intake amount of the crankshaft chamber 1 in FIG. 13) only be filled in the left cylinder chamber 2 to make the left cylinder chamber 2 have a charging effect. Similarly, as shown in FIG. 11, when the two pistons 4 jointly move toward the crankshaft chamber 1 to completely compress the crankshaft chamber 1, the intake amount of the two cylinder chambers 2 only be filled in the right cylinder chamber 2 to make the right cylinder chamber 2 have a charging effect. Therefore, the combustion stroke of the cylinder chambers 2 may generate greater combustion force to improve the power efficiency of the internal combustion engine 10 with the charging system.

Furthermore, as shown in FIG. 7, when the left cylinder chamber 2 generates the intake stroke, the sealing block 202 blocks and closes the joint a4 between the crankshaft chamber 1 and the right draft tube 6 to make fuel, and air and lubricant be unable to flow into the right draft tube 6. The fuel, air and lubricant only fill the left cylinder chamber 2 and the left draft tube 6 to reduce the volume of the left cylinder chamber 2 and increase the pressure of the left cylinder chamber 2. Similarly, as shown in FIG. 11, when the right cylinder chamber 2 generates the intake stroke, the sealing block 202 blocks and closes the joint a4 between the crankshaft chamber 1 and the left draft tube 6 to make fuel, and air and lubricant be unable to flow into the left draft tube 6. The fuel, air and lubricant only fill the right cylinder chamber 2 and the right draft tube 6 to reduce the volume of the right cylinder chamber 2 and increase the pressure of the right cylinder chamber 2. Therefore, the combustion stroke of the cylinder chambers 2 may generate greater combustion force to improve the power efficiency of the internal combustion engine 10 with the charging system.

In addition, the intake pipe 5 only communicates with the crankshaft chamber 1, one end of each draft tube 6 only communicates with the crankshaft chamber 1 and the other end of each draft tube 6 only communicates with each cylinder chamber 2, the intake pipe 5 is connected to the upper portion 13, and the two draft tubes 6 are separately connected to the lower portion 14, so that the fuel, air and lubricant entered via the intake pipe 5 need to pass through the crankshaft chamber 1 to flow to the two draft tubes 6. The fuel, air, and lubricant need to uniformly lubricating the crankshaft disc 31 to flow to the two draft tubes 6. This enhances the operational smoothness and the service life of the crankshaft connecting rod mechanism 3. At the same time, the fuel, air, and lubricant flow to the cylinder chambers 2 via the intake pipe 5, the crankshaft chamber 1 and the draft tubes 6 in order, so as to avoid the crankshaft chamber 1, the draft tubes 6 or the cylinder chambers 2 from generating turbulence to stabilize the operational efficiency of the internal combustion engine 10 with the charging system.

Figure 14:
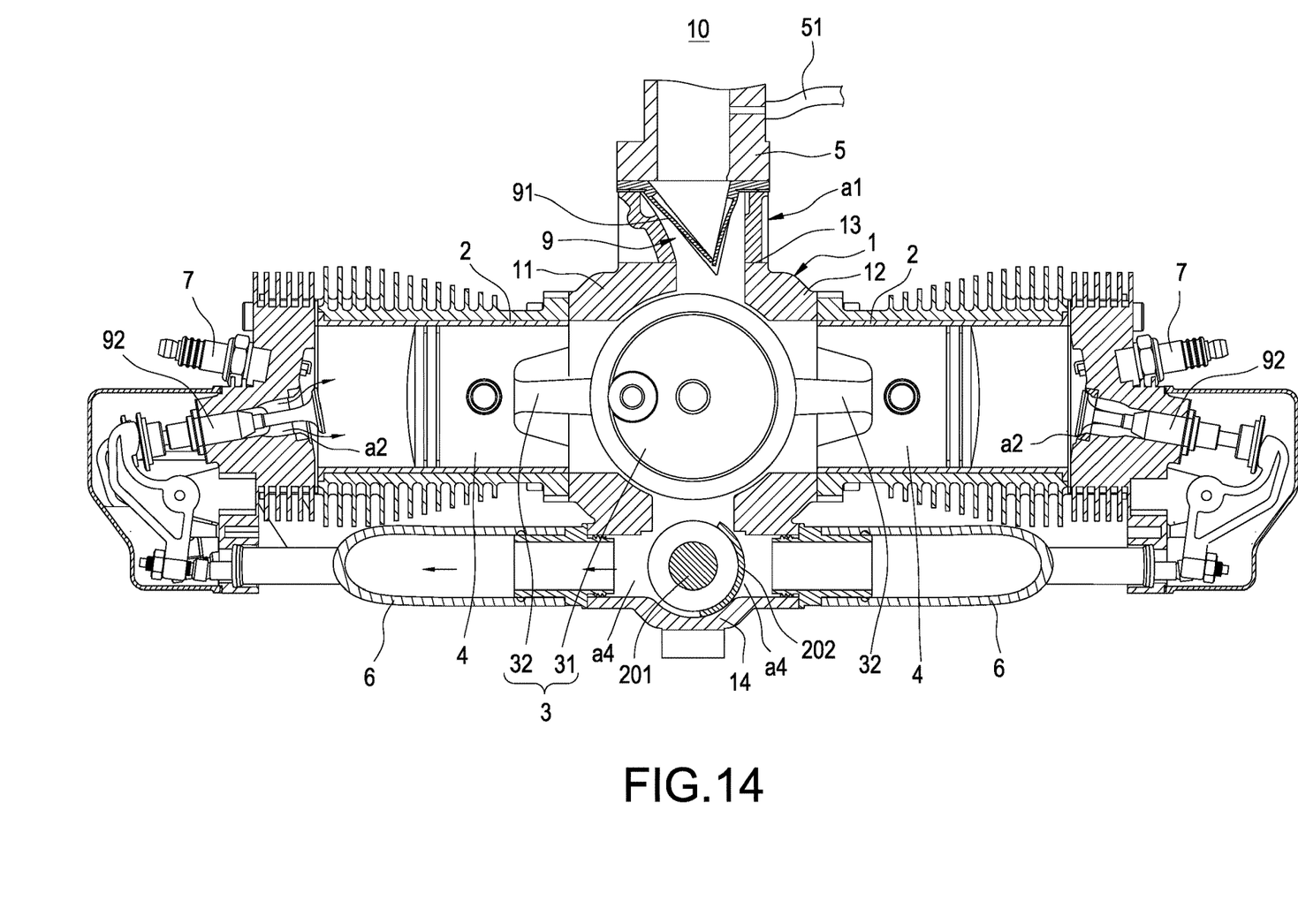
FIG. 14 is a cross-sectional schematic view of another embodiment of the internal combustion engine with the charging system of the disclosure.

Please refer to FIG. 14, which shows another embodiment of the internal combustion engine 10 with the charging system of the disclosure. The embodiment shown in FIG. 14 is similar to the embodiment shown in FIGS. 1-13. The embodiment shown in FIG. 14 differs from the embodiment shown in FIGS. 1-13 by further including a lubricant nozzle 51 in the internal combustion engine 10.

In detail, the internal combustion engine 10 with the charging system of the disclosure further includes the lubricant nozzle 51 installed on the intake pipe 5 and arranged corresponding to the internal chamber of the intake pipe 5. The intake pipe 5 is used to guide the external mixture of fuel and air to enter the internal chamber of the intake pipe 5. The lubricant nozzle 51 is used to guide the external lubricant to enter the internal chamber of the intake pipe 5.

Finally, fuel, air, and lubricant flow into the crankshaft chamber 1 after being mixed in the internal chamber of the intake pipe 5. Therefore, the same functions and effects as the embodiment shown in FIGS. 1-13 may be accomplished.

While this disclosure has been described by means of specific embodiments, numerous modifications and variations could be made thereto by those skilled in the art without departing from the scope and spirit of this disclosure set forth in the claims.

What is claimed is:

1. A internal combustion engine with a charging system, the internal combustion engine comprising:
   a crankshaft chamber;
   at least two cylinder chambers;
   a crankshaft connecting rod mechanism, installed in the crankshaft chamber;
   at least two pistons, separately received in each cylinder chamber, and separately connected and acting with the crankshaft connecting rod mechanism;
   an intake pipe, only communicating with the crankshaft chamber;
   at least two draft tubes, one end of each draft tube only communicating with the crankshaft chamber and another end of each draft tube only communicating with each cylinder chamber;
   a check valve assembly comprising:
   a check valve, installed at a joint between the intake pipe and the crankshaft chamber; and
   at least two first switch valve, separately installed at a joint between each draft tube and each cylinder chamber; and
   a rotating rod control mechanism, installed in the crankshaft chamber, and comprising:
   a rotating rod; and
   a sealing block, fixedly connected to the rotating rod, and configured to rotate with the rotating rod and block and seal a joint between the crankshaft chamber and each draft tube.

2. The internal combustion engine of claim 1, wherein an amount of each of the cylinder chambers, the pistons, the draft tubes and the first switch valves is two, the crankshaft chamber comprises a left portion, a right portion, an upper portion and a lower portion, one of the cylinder chambers is connected to the left portion, and another cylinder chamber is connected to the right portion, the intake pipe is connected to the upper portion, and the two draft tubes are separately connected to the lower portion.

3. The internal combustion engine of claim 2, wherein the crankshaft chamber and each cylinder chamber are isolated by each piston, the two pistons are configured to jointly move toward or away from the crankshaft chamber, and moving directions of the two pistons are parallel.

4. The internal combustion engine of claim 3, wherein the crankshaft connecting rod mechanism comprises a crankshaft disc and at least two connecting rods, the crankshaft disc is installed in the crankshaft chamber, one end of each connecting rod is connected with the crankshaft disc and another end of each connecting rod passes through each cylinder chamber, and each piston is connected to each connecting rod and configured to reciprocate in each cylinder chamber with each connecting rod.

5. The internal combustion engine of claim 4, wherein the rotating rod control mechanism further comprises two first tappets and a first cam, the first cam is fixedly connected to the rotating rod and configured to rotate with the rotating rod, and one end of each first tappet is connected to each first switch valve and another end of each first tappet is pushed by the first cam.

6. The internal combustion engine of claim 5, further comprising at least two spark plugs, wherein each spark plug is connected on a side of each cylinder chamber away from the crankshaft chamber and arranged corresponding to each cylinder chamber.

7. The internal combustion engine of claim 6, further comprising at least two exhaust pipes, wherein each exhaust pipe only communicates with each cylinder chamber, the check valve assembly further comprises at least two second switch valves, and each second switch valve is installed at a joint between each exhaust pipe and each cylinder chamber.

8. The internal combustion engine of claim 7, wherein the rotating rod control mechanism further comprises two second tappets and a second cam, the second cam is fixedly connected to the rotating rod and configured to rotate with the rotating rod, and one end of each second tappet is connected to each second switch valve and another end of each second tappet is pushed by the second cam.

9. The internal combustion engine of claim 7, wherein each draft tube and each exhaust pipe are separately disposed on two sides of each spark plug.

10. The internal combustion engine of claim 8, further comprising a linkage gear set installed in the crankshaft chamber, wherein the linkage gear set comprises a first gear and a second gear, the first gear is fixedly connected to the crankshaft disc and configured to rotate with the crankshaft disc, the second gear is engaged with the first gear, the second gear is fixedly connected to the rotating rod and configured to drive the rotating rod to rotate, and a gear ratio of the first gear to the second gear is 1:2.

11. The internal combustion engine of claim 1, further comprising a lubricant nozzle installed on the intake pipe and arranged corresponding to an internal chamber of the intake pipe.

* * * * *